(12) United States Patent
Eichler

(10) Patent No.: US 11,128,122 B2
(45) Date of Patent: Sep. 21, 2021

(54) POWER ELECTRONICS WITH ISOLATING FUSE

(71) Applicant: Liebherr-Components Biberach GmbH, Biberach an der Riß (DE)

(72) Inventor: Markus Eichler, Waldshut (DE)

(73) Assignee: Liebherr-Components Biberach GmbH

( * ) Notice: Subject to any disclaimer, the term of this patent is extended or adjusted under 35 U.S.C. 154(b) by 0 days.

(21) Appl. No.: 16/461,023

(22) PCT Filed: Nov. 15, 2017

(86) PCT No.: PCT/EP2017/001337
§ 371 (c)(1),
(2) Date: May 15, 2019

(87) PCT Pub. No.: WO2018/091138
PCT Pub. Date: May 24, 2018

(65) Prior Publication Data
US 2019/0280474 A1    Sep. 12, 2019

(30) Foreign Application Priority Data

Nov. 15, 2016 (DE) .................... 20 2016 007 006.2
Jan. 20, 2017 (DE) .................... 20 2017 000 338.4

(51) Int. Cl.
*H02H 7/00* (2006.01)
*H02H 1/00* (2006.01)
(Continued)

(52) U.S. Cl.
CPC .............. *H02H 7/00* (2013.01); *F03D 9/255* (2017.02); *H02H 1/0007* (2013.01); *H02H 3/38* (2013.01);
(Continued)

(58) Field of Classification Search
CPC .......... H02H 7/00; H02H 3/38; H02H 1/0007; F03D 9/255; Y02E 10/72; H01H 39/00
See application file for complete search history.

(56) References Cited

U.S. PATENT DOCUMENTS 3,887,860 A    6/1975  Bernhardt et al.
5,708,576 A    1/1998  Jones et al.
(Continued)

OTHER PUBLICATIONS

Bagger, Version Nov. 8, 2016, in: Wikipedia, https://de.wikipedia.org/w/index.php?title=Bagger&oldid=159483, 22 pages.
(Continued)

*Primary Examiner* — Bickey Dhakal
(74) *Attorney, Agent, or Firm* — Troutman Pepper Hamilton Sanders LLP; Ryan A. Schneider

(57) ABSTRACT

Electric drive devices having at least one power electronics module including at least one voltage circuit having power electronics components such as a converter, transformer, frequency inverter, power capacitor, circuit breaker and the like, and at least one fuse for interrupting the voltage circuit in the event of excess currents and/or voltages. The invention also relates to a wind turbine and similar large industrial electrical systems having such a drive device. The device can comprise at least one pyrotechnic fuse with a propellant charge for the irreversible interruption of the voltage circuit, wherein the pyrotechnic fuse is arranged in the voltage circuit of the power electronics module or immediately adjacent to at least one power electronics component such as a converter, frequency inverter, transformer, power capacitor or circuit breaker.

16 Claims, 4 Drawing Sheets

(51) Int. Cl.
  *F03D 9/25* (2016.01)
  *H02H 7/12* (2006.01)
  *H02H 3/38* (2006.01)
  *H01H 39/00* (2006.01)
(52) U.S. Cl.
  CPC ............... *H02H 7/12* (2013.01); *H01H 39/00* (2013.01); *Y02E 10/72* (2013.01)

(56) References Cited

U.S. PATENT DOCUMENTS

| | | | |
|---|---|---|---|
| 9,654,028 B1* | 5/2017 | Luo | H02M 7/53875 |
| 9,865,411 B2* | 1/2018 | Friebe | H02H 3/08 |
| 10,361,048 B2* | 7/2019 | von zur Muehlen | H01H 39/006 |
| 2004/0145337 A1* | 7/2004 | Morishita | H02P 25/16 318/801 |
| 2006/0203528 A1* | 9/2006 | Miyazaki | H02M 1/32 363/131 |
| 2008/0137253 A1* | 6/2008 | George | H01H 9/106 361/93.1 |
| 2011/0012740 A1 | 1/2011 | Macdougall et al. | |
| 2011/0031815 A1* | 2/2011 | Beck | H02H 7/1222 307/78 |
| 2011/0267852 A1 | 11/2011 | Asplund | |
| 2012/0043761 A1* | 2/2012 | White | F03D 9/255 290/55 |
| 2012/0127621 A1 | 5/2012 | Knapp, Jr. et al. | |
| 2013/0208518 A1* | 8/2013 | Kinoshita | H02M 7/537 363/40 |
| 2014/0192570 A1 | 7/2014 | Nielsen et al. | |
| 2015/0207449 A1 | 7/2015 | Clendenen et al. | |
| 2016/0031391 A1 | 2/2016 | Dong et al. | |
| 2016/0268820 A1* | 9/2016 | Ono | B60L 53/16 |
| 2019/0097453 A1* | 3/2019 | Saito | H02J 7/34 |

OTHER PUBLICATIONS

Windkraftanlage, Version Nov. 14, 2016, in: Wikipedia, 52 pages.
German Search Report for DE 202017000338.4 dated Oct. 6, 2017.
International Search and Written Opinion for PCT/EP2017/001337 dated Mar. 27, 2018.
Office Action from Chinese Application No. 201780070495.7 dated Jan. 14, 2021 (6 pages).

* cited by examiner

POWER ELECTRONICS WITH ISOLATING FUSE

CROSS-REFERENCE TO RELATED APPLICATIONS

This application is a § 371 national stage of International Application PCT/EP2017/001337, with an international filing date of 15 Nov. 2017, which claims the benefit of both DE Patent Application Serial No. 20 2016 007 006.2, filed on 15 Nov. 2016, and DE Patent Application Serial No. 20 2017 000 338.4, filed on 20 Jan. 2017, the benefits of the earlier filing dates of which are hereby claimed under 35 USC § 119(a)-(d) and (f). The entire contents and substance of all applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to electric drive devices having at least one power electronics module which comprises at least one voltage circuit having power electronics components such as a converter, transformer, frequency inverter, power capacitor, circuit breaker and the like, and at least one fuse for interrupting the voltage circuit in the event of excess currents and/or voltages. The invention also relates to a wind turbine and similar large industrial electrical systems having such a drive device.

2. Description of Related Art

Industrial drive devices having electric generators and/or electric motors generate or process considerable powers that as a rule can be in the megawatt range and can reach single-digit, or two-digit, or possibly even three-digit megawatt figures. Such industrial high-power drive devices are installed, for example, in wind turbines that can provide powers in the range of some megawatts, with today's wind turbines typically being established in the range of 2-8 megawatts.

A correspondingly high-power density in the power electronics of such drive devices has to be handled in accompaniment with such high-powers, with this as a rule having to take place in a very tight space or in a switch cabinet limited in size. There is, for example, a demand with wind turbines to install the inverter system for a 5-megawatt turbine in a standard switch cabinet having dimensions of 0.8 m×2 m×0.6 m width×height×depth to be able to satisfy the very limited installation area in a nacelle. Similar power densities do not only have to be installed in wind turbines, but also in other industrial drive systems such as large industrial drives, marine drives, but also material transfer units such as mining excavators, mining trucks, surface miners, and other mining units or also container gantry cranes and large construction machinery such as cranes.

If defects occur in the power electronics of such high-power drives, considerable mechanical destruction can occur due to explosive energy discharges. In the event of a defect of one of the power electronics modules—for example on the failure of a transistor such as an IGBT (insulated gate bipolar transistor), a circuit breaker, or a converter—a fast discharge of the locally stored energy in the intermediate circuit capacitors occurs and/or high currents occur due to the feed connection that can comprise a mains connection with an almost infinite energy flow, but that can also come from a generator. These high energies result in explosive energy discharges up to arcs that have the consequence of substantial mechanical destruction and have a corresponding hazard potential.

On the one hand, as a rule not only the defective component itself is destroyed in this process, but also adjacent components of the power electronics so that the damage is correspondingly large. On the other hand, there is the risk that the switch cabinet doors are torn open in the event of an arc and hot plasma escapes, with any operators present being able to be injured. To prevent this, the switch cabinets are therefore sometimes reinforced by very solid constructions to ensure a fault arc resistance. As a rule, there are also long downtimes of the turbine and thus associated yield and production losses.

Such energy discharges cannot only arise due to defects and aging of the power electronics components themselves, but can also be caused by inattention such as electrical connections that are not firmly screwed or forgotten tools, dirt, moisture, or foreign bodies of all kinds such as animals.

To avoid such damage and hazards, as a rule fuses are installed in the voltage circuits to interrupt the current flow when excessive currents or voltage fluctuations occur. Such fuses can comprise mechanical disconnection means such as circuit breakers that, however, require 30 to 70 milliseconds or even longer to interrupt the electric circuit by opening, which cannot prevent damage to adjacent components with very quickly increasing excess currents. In addition, the customary circuit breakers available on the market have very limited disengageable short-circuit current switching capability, for example at current levels in the range from 85 to 100 kiloamperes so that a failure of the circuit breaker can occur at very high-power densities.

Said fuses can also comprise safety fuses that can be installed between the power electronics modules to avoid the explosive mechanical damage at a power module and at its adjacent components. However, the construction of such safety fuses between IGBT modules and intermediate circuit capacitors or between a DC bus and intermediate circuit capacitors has proven very difficult since current peaks should be possible on the switching on of the intermediate circuits and in operation without the safety fuse triggering. Safety fuses directly connected to the IGBT additionally increase the leakage inductance of the electric circuit from a construction aspect and hereby reduce the utilization of the IGBT semiconductor modules.

In the event of a defect, the fuse as a rule triggers here that is closest to the defect site in accordance with the fuse-specific characteristic with times in the range of several milliseconds. As a rule, adjacent fuses are here likewise partly fused by the excess current and the voltage peaks so that as a precaution they have to be completely replaced on repair. In addition, accelerated aging and possibly even a triggering in normal operation occurs with the safety fuses due to overload current peaks that also occur in normal operation without a defect being present in the component protected by the fuse.

On the other hand, it has also already been proposed to recognize an arc that occurs by means of optical sensor systems and thereupon to initiate a three-phase short circuit at the busbar by means of a pyrotechnic short-circuit device. Such a system can avoid arc development within the busbar system at very short notice. It is, however, a disadvantage that a very high short-circuit current flows through the busbar until the power circuit breaker disconnects the busbar short circuit from the power. In addition, the power circuit breaker as a rule has to switch off several thousand amperes, whereby the power circuit breaker is subject to very high wear and possibly likewise has to be replaced or at least checked or reconditioned. Furthermore, such a three-phase short circuit on the busbar system causes a voltage drop in the power grid and can produce the triggering of further protection devices of adjacent energy supply circuits.

BRIEF SUMMARY OF THE INVENTION

It is therefore the underlying object of the present invention to provide an improved electric drive device of the initially named kind which can avoid the disadvantages of the prior art and further develop the latter in an advantageous manner. Defective components of the power electronics should in particular be removed from the main current circuit in a simple and inexpensive manner and damage to adjacent or other components should be avoided to possibly maintain a partial operation at reduced power with a redundant configuration of the drive device and to avoid expensive and complex repair work. High safety should nevertheless be achieved without having to take special measures against arc hazards at the switch cabinet housing.

Said object is achieved in accordance with the invention by an electric drive device having at least one power electronics module that comprises at least one voltage circuit having power electronics components such as a converter, transformer, frequency inverter, power capacitors, switching power supplies and the like, and at least one fuse for interrupting the voltage circuit in the event of excess currents and/or predefined voltages, wherein the fuse comprises at least one pyrotechnic fuse with a propellant charge for the irreversible interruption of the voltage circuit, and wherein said pyrotechnic fuse is arranged in the voltage circuit of the power electronics module or immediately adjacent to the power electronics components of the power electronics module.

It is therefore proposed to provide one or more pyrotechnic fuses directly in the voltage circuit of the power electronics module or immediately adjacent to at least one of the power electronics components. The energy flow can be interrupted extremely fast, for example in less than one millisecond, by an arrangement of a pyrotechnic fuse close to a converter and the mechanical destruction of adjacent components can thus be avoided, with the disconnection taking place locally at the defect location and high short circuit currents and voltage drops in the system of the electric drive device and any power grid connected thereto can be avoided. In accordance with the invention, the device comprises at least one pyrotechnic fuse with a propellant charge for the irreversible interruption of the voltage circuit, wherein said pyrotechnic fuse is arranged in the voltage circuit of the power electronics module or immediately adjacent to at least one power electronics component such as a converter, frequency inverter, transformer, power capacitor or circuit breaker. Due to the extremely fast local disconnection at the defect location, adjacent power electronics components can be preserved from damage or aging so that a complete replacement of all the fuses of the drive system can be avoided.

The space requirements of such pyrotechnic fuses is here no larger or even smaller than the space requirements of conventional safety fuses. In this respect, the power loss of a pyrotechnic fuse is significantly smaller—for example by a factor of 2 to 4—than the power loss of a safety fuse so that a smaller cooling requirement is present and closed switch cabinets can be used. In addition, an increase in the leakage inductance of the electric circuit such as occurs on the use of safety fuses can be avoided, whereby IGBT semiconductor components, for example, can be better utilized.

The propellant charge of the pyrotechnic fuse, that can, for example, comprise a detonator, and drives a disconnection element, for example in the form of a disconnection plunger, for disconnecting the current path, can here generally be ignited or activated in different manners. The propellant charge of the pyrotechnic fuse can in particular be ignited by a disconnection signal that indicates a defect at the power electronics module and is accompanied by an excessive voltage and/or current fluctuation at the power electronics module. If an excessive voltage and/or current fluctuation occurs at the power electronics module and/or at a connector connected thereto such as a power connection, the pyrotechnic fuse triggers.

In this respect, on the occurrence of an excess current at the power electronics module and/or at the connector that is connected thereto itself and/or on a voltage drop accompanying it between sections of the voltage circuit of the power electronics module, a signal can be generated and/or a voltage signal hereby induced can serve to trigger the propellant charge, for example in that the propellant charge is connected to a power electronic component or to a connection connected thereto or to a connector connected thereto. In a further development of the invention, the propellant charge of the at least one pyrotechnic fuse can be triggered free of external feeds, in particular by a current and/or a voltage at the power electronics module that indicates an internal defect.

It is, however, alternatively likewise possible optionally to provide an external feed that triggers the propellant charge and is interconnected to the propellant charge or is conducted to it in dependence on an occurrence of a defect at the power electronics module, for example on an occurrence of an excessive voltage and/or current fluctuation.

At least one voltmeter can in particular be associated with the power electronics module that can, for example, be connected to two sections of the voltage circuit of the power electronics module and that provides a voltage signal in dependence on which the propellant charge of the pyrotechnic fuse is triggered. The voltmeter can be configured here such that such a voltage signal is only emitted on an excessive voltage fluctuation and/or current fluctuation, in particular on an excessive voltage drop. Alternatively or additionally, the voltage signal provided by the voltmeter can be evaluated and/or processed, in particular such that the voltage signal triggers the propellant charge when it indicates an excessive voltage fluctuation at the power electronics module.

Alternatively or additionally to such a voltmeter, an ammeter can also be associated with the power electronics module and/or with a connector connected thereto that can, for example, be connected to a power electronics component or to a connector connected thereto and/or that can measure the current that flows into or out of a power electronics component. Said ammeter can provide a current signal in dependence on which the propellant charge is ignited and/or can be configured only to provide a current signal when a predefined excess current occurs at the power electronics module or at a connector connected thereto.

In a further development of the invention, the propellant charge of the pyrotechnic fuse can, for example, be triggered by a voltage or current from an inductance coil and/or from a capacitor of the power electronics module. A power capacitor that can, for example, be arranged in the intermediate circuit of the power electronics module can be designed, for example, as isolated with an inductance coil as an intermediate layer in order to trigger the pyrotechnic fuse by a voltage from said inductance coil on a predefined current flow and/or current increase in the intermediate circuit. If an excessive current change occurs at the capacitor, a voltage is built up in the inductance coil formed as an intermediate layer that can trigger the pyrotechnic fuse.

Alternatively or additionally, such a power capacitor that can, for example, be provided in the intermediate circuit of the power electronics can also be provided with individual voltage measurements, for example in the form of voltage dividers at individual capacitor cans to immediately trigger the pyrotechnic fuse on a short circuit of a capacitor can.

Independently of the specific triggering of the propellant charge by external feeds or free of external feeds, the pyrotechnic fuse or a plurality of pyrotechnic fuses can be provided at different sections of the drive device and/or can be associated with different power electronics components of the power electronics.

For example, a pyrotechnic fuse can be provided between an intermediate capacitor circuit and a DC voltage bus or can be connected to a connection between said intermediate capacitor circuit and a DC voltage bus.

Alternatively or additionally, a pyrotechnic fuse can also be provided between said intermediate capacitor circuit and a DC voltage connector of a transistor, in particular of an IGBT, and/or can be connected to a connection between said intermediate capacitor circuit and the DC voltage connector of the transistor.

Alternatively or additionally, a pyrotechnic fuse can be arranged in an AC voltage circuit and/or in a DC voltage circuit at a power electronics module.

Alternatively or additionally, a pyrotechnic fuse can also be provided at an AC voltage input circuit and/or at an AC voltage output circuit.

Alternatively or additionally, a pyrotechnic fuse can also be provided between a generator and an inverter module.

Alternatively or additionally, a pyrotechnic fuse can also be provided between an inverter module and a power connector.

The invention will be explained further in the following with respect to preferred embodiments and to associated drawings. There are shown in the drawings.

DETAIL DESCRIPTION OF THE INVENTION

Figure 1:
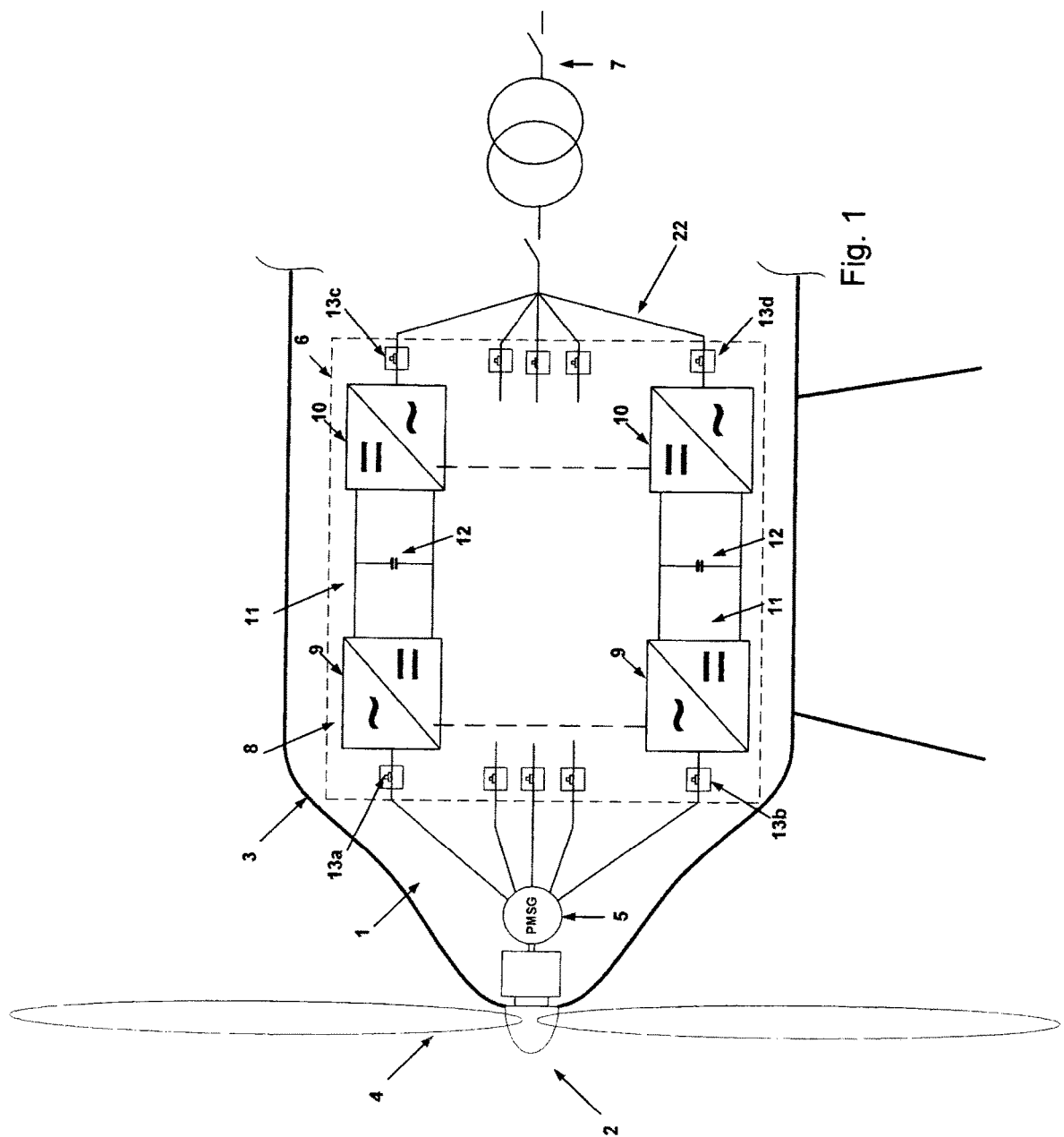
FIG. 1: a schematic representation of the electric drive device of a wind turbine in which a generator drivable by the rotor blade can be connected via a power electronics module having frequency inverters to a power grid, with pyrotechnic fuses being provided at the interfaces of the power electronics module.

As FIG. 1 shows, the electric drive device 1 can be part of a wind turbine 2 and can, for example, be integrated in the only indicated nacelle 3 of the wind turbine 2 or can be received there. Such a nacelle 3 is typically seated rotatably about an upright axis of rotation on a tower and supports the rotor 4 that can comprise a horizontal rotor shaft and drives a generator 5 that can, for example, be a permanent magnet generator.

As FIG. 1 shows, said generator 5 of the drive device 1 can be connected to a power grid 7 via a power electronics module 6 to feed the current produced by the generator 5 into said power grid 7.

Said power electronics module 6 can comprise different power electronics components, for example converters 8 in the form of rectifiers 9 and inverters 10 that can each be connected to one another via an intermediate circuit 11 having one or more capacitors 12.

As FIG. 1 shows, pyrotechnic fuses 13a, 13b, 13c, and 13d can be provided immediately adjacent to the power electronics components of the power electronics module 6, with said pyrotechnic fuses in particular being able to be arranged directly at the converters 8, that is, in particular without interposition of other elements and thus close to the converter.

In an advantageous further development of the invention, pyrotechnic fuses 13a and 13b can be connected between the generator 5 and the converters 8 connected thereto, in particular the shown rectifiers 9 in the voltage circuit. Alternatively or additionally, pyrotechnic fuses 13c and 13d can be arranged between the power electronics module 6 and the power connector to the power grid 7 or at the connectors of the power electronics module 6 to the power grid 8. As FIG. 1 shows, said pyrotechnic fuses 13c and 13d can be arranged between the converters 8, in particular in the form of the shown inverters 10 and the power connector to the power grid 7.

Figure 4:
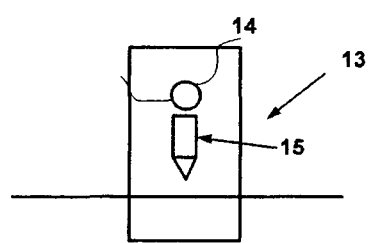
FIG. 4: a schematic representation of a pyrotechnic fuse with a propellant charge 14 for the irreversible interruption of the current path of the fuse.

Said pyrotechnic fuses 13 can comprise, as FIG. 4 shows, a propellant charge 14 that can cause a movable disconnection element 15 to disconnect the current path passing through the fuse and thus to irreversibly interrupt it. Said propellant charge 14 can, for example, be electrically ignited in that a sufficient voltage and/or a sufficient current is applied to the propellant charge 14 or can ignite automatically at a maximum settable permitted excess current.

Figure 2:
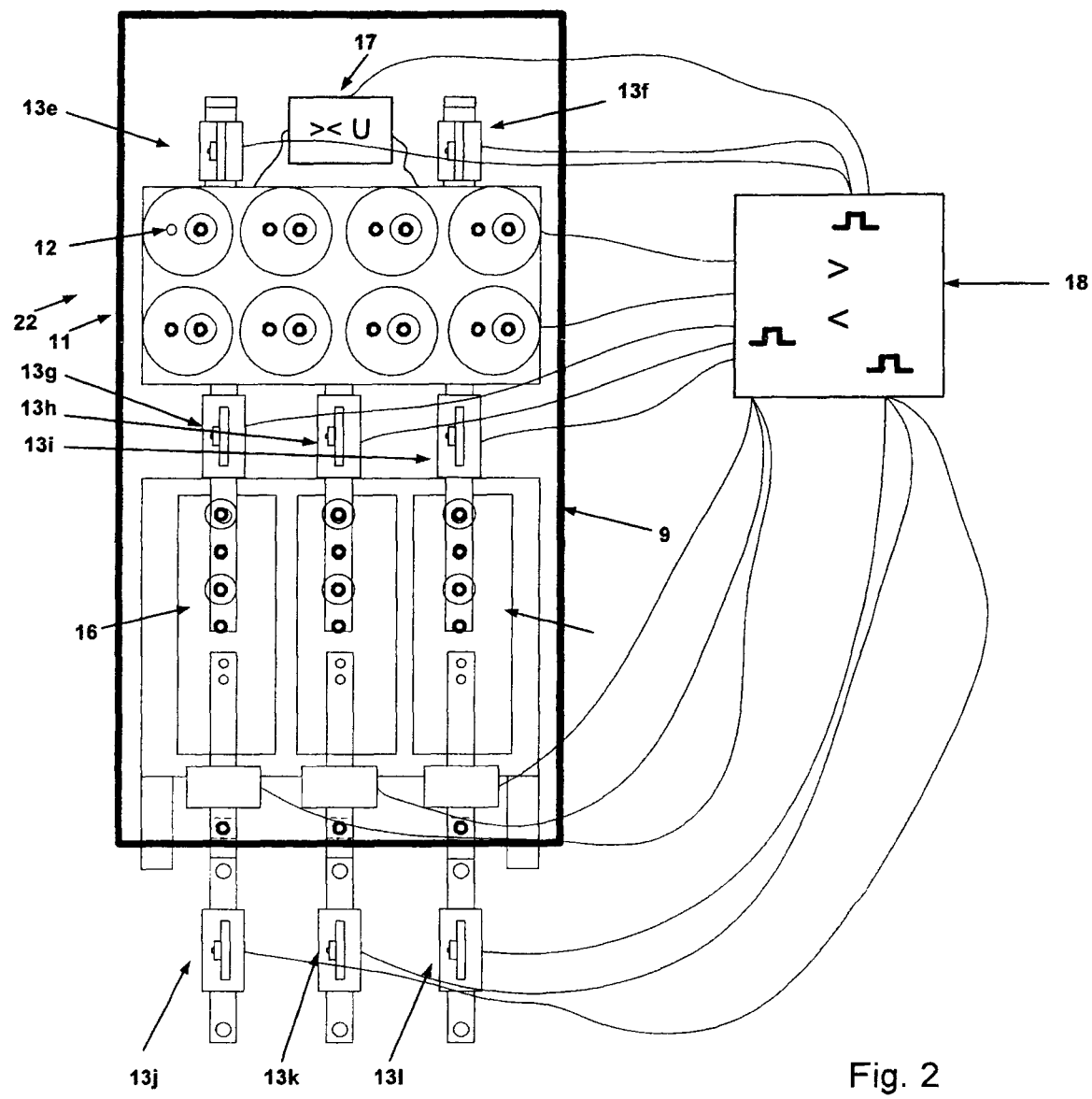
FIG. 2: a schematic representation of a power electronics module that has as power electronics components inter alia intermediate circuit capacitors having induction loops and that has transistors in the form of IGBT semiconductor modules, with pyrotechnic fuses being provided at the interfaces of the power electronics components and being ignited in dependence on voltage fluctuations at the intermediate circuit capacitors and at their connectors.

As FIG. 2 shows, the power electronics module 6 of FIG. 1—or also a different power electronics module 6 of a different drive device 1—can also comprise further power electronics components and/or can have further pyrotechnic fuses 13. As FIG. 2 shows, pyrotechnic fuses 13a to 13i can, for example, be arranged directly at the inputs or outputs of an intermediate circuit capacitor, with on the one side of the intermediate circuit 11, the pyrotechnic fuses 13e and 13f being able to be arranged at the intermediate circuit connectors or capacitor connectors, while on the other side of the intermediate circuit 11, the pyrotechnic fuses 13d, 13h, and 13i being provided, in particular being able to be arranged between the intermediate circuit capacitor and the transistors connected thereto, for example in the form of IGBT semiconductor elements, cf. FIG. 2.

Further pyrotechnic fuses 13j, 13k, and 13l can furthermore be associated with said transistors or said IGBT semiconductor modules, and indeed on the other side of said IGBTs 16 that is remote from the intermediate circuit 11.

Said pyrotechnic fuses 13e to 13l can advantageously be adapted to be triggered or ignited in dependence on predefined current changes and/or predefined voltage changes that reach a specific value and that occur in or at the power electronics module, in particular in or at the power electronics components, to hereby disconnect the power flow.

As, for example, FIG. 2 shows, the voltage applied to the connectors of the intermediate capacitor circuit 11 can be measured by means of a voltmeter 17 and can be reported in the form of a voltage signal to an evaluation device 18, which evaluation device 18 can then trigger the pyrotechnical fuses on the occurrence of predefined voltage fluctuations, in particular of a predefined voltage drop.

Said evaluation device 18 can also be connected to the capacitor 12 of the intermediate circuit 11. Said capacitor 12 can, for example, be designed as isolated with an induction coil as an intermediate layer to trigger the pyrotechnic fuses with a voltage from the induction coil at a fixed power increase di/dt in the intermediate circuit 11. It is also possible here to carry out individual voltage measurements e.g. by means of voltage dividers at the individual capacitor cans to provide a corresponding signal to the evaluation device 18 and to trigger the pyrotechnic fuses on a short-circuit of a capacitor.

Figure 3:
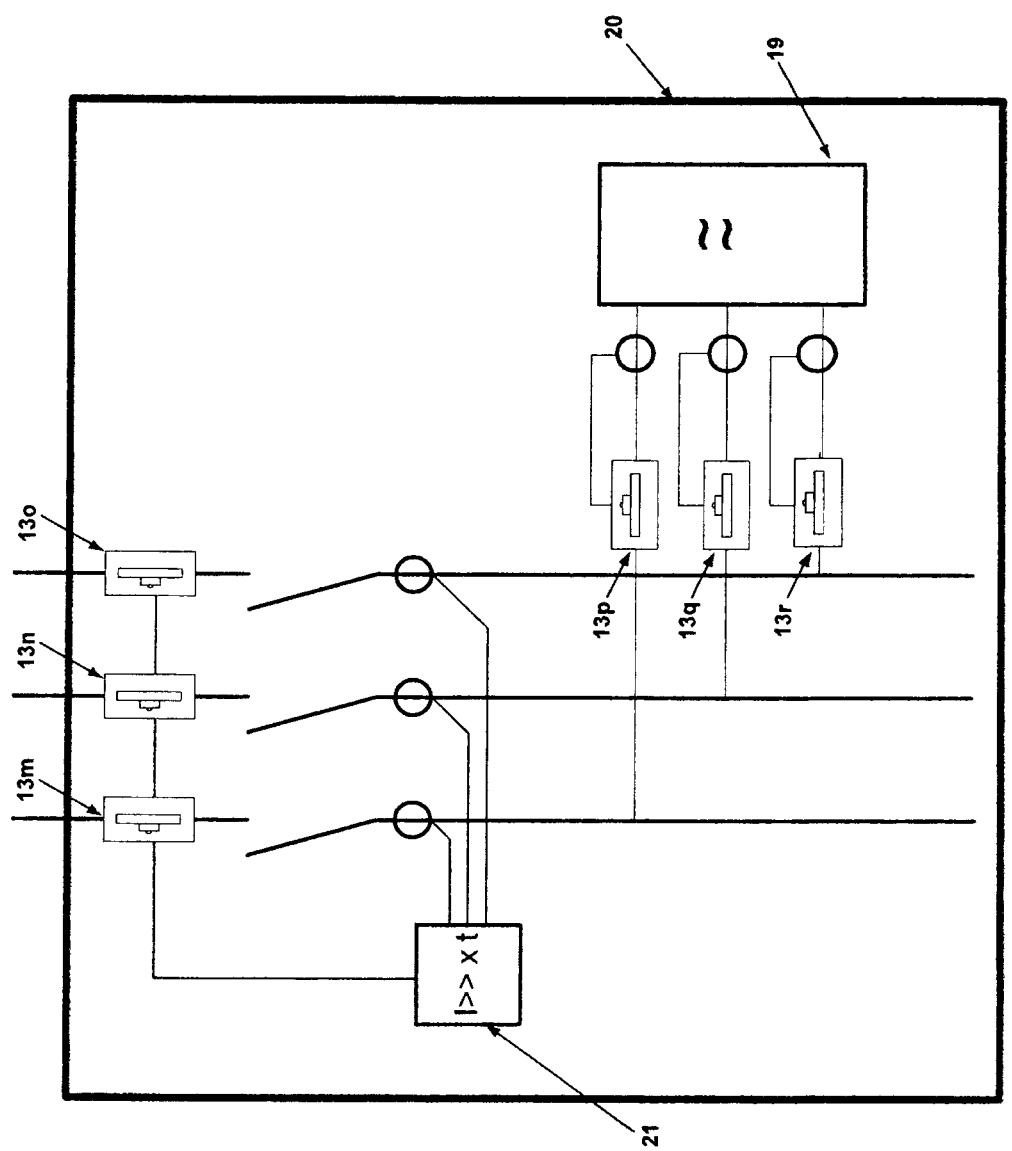
FIG. 3: a schematic representation of a switch cabinet with filter modules, with pyrotechnic fuses being provided at/in the filter modules and at the power feed connectors and being ignited by a self-feeding excess current protective relay.

As FIG. 3 shows, pyrotechnic fuses 13m to 13r can also be provided in or at filter modules 19 or can be connected in the voltage circuit connected thereto, said filter modules 19 being able to be accommodated in an only indicated switch cabinet 20. Said switch cabinet 20 can, for example, likewise be accommodated in the nacelle 3 of the wind turbine 2, but depending on the design of the drive device 1 can also be provided at a different point.

As FIG. 3 shows, the one or more filter modules 19 can be connected via a self-feeding excess current protective relay 21 at the power connectors before the circuit breaker and/or the power load disconnector for feeding into the power grid 7. In a further development of the invention, one or more pyrotechnic fuses 13p, 13q, and 13r can here be provided directly at the one or more filter modules 19. Alternatively or additionally, one or more pyrotechnic fuses 13m, 13n, and 13o can be provided at the power connectors or on the side of the protective relay 21 remote from the filter module 19.

The pyrotechnic fuses 13p, 13q, and 13r directly attached to the filter module 19 can, for example, be ignited by the current that occurs in the circuit between the filter module 19 and the protective relay 21 and that exceeds a predefined value, for example.

Alternatively or additionally, the pyrotechnic fuses 13m, 13n, and 13o at the power connector side can be controlled by the excess current protective relay 21 and can receive a disconnection signal from it that occurs when a corresponding excess current occurs at the excess current protective relay 21.

The invention claimed is:

1. An electric drive device comprising:
a power electronics module comprising:
a voltage circuit comprising a power electronic component;
an intermediate capacitor circuit comprising an intermediate circuit capacitor;
a rectifier and an inverter connected to one another via the intermediate capacitor circuit; and
a pyrotechnic fuse with a propellant charge for irreversible interruption of the voltage circuit in an event that necessitates the irreversible interruption of the voltage circuit;
wherein the pyrotechnic fuse is arranged between the intermediate capacitor circuit and the power electronic component;
wherein the pyrotechnic fuse is adapted to:
receive a disconnection signal that indicates a defect at the power electronics module and that accompanies one or both of an excessive voltage and current change at the power electronics module;
trigger in dependence on the received disconnection signal; and
interrupt the voltage circuit; and
wherein the propellant charge is adapted to be ignited by one or both of:
one or both current and voltage from a coil that is provided as an isolator layer in the intermediate circuit capacitor; and
one or both a voltage and current measurement signal that indicates one or both voltage and current at the intermediate circuit capacitor.

2. The electric drive device of claim 1, wherein the propellant charge is configured as triggerable free of external feeds and is adapted to be triggered by one or both of a current increase and a voltage change at the power electronics module.

3. The electric drive device of claim 1, wherein the pyrotechnic fuse is adapted to be triggered by at least one of the following events:
a predefined drop of an intermediate capacitor circuit voltage;
a predefined increase of an intermediate capacitor circuit current;
a signal of an arc detection device for detecting an arc;
an excess current at an excess current protective relay at a power circuit breaker;
a predefined excess current at a converter of the voltage circuit;
a predefined voltage from an intermediate capacitor circuit coil; and
a predefined current at the intermediate circuit capacitor of the intermediate capacitor circuit.

4. The electric drive device of claim 3, wherein the pyrotechnic fuse is adapted to be triggered on at least three of the events.

5. The electric drive device of claim 1, wherein the pyrotechnic fuse is adapted to trigger by one or both an excessive current and voltage change at the power electronics component.

6. The electric drive device of claim 1, wherein the power electronics module is configured to process power in the range of megawatts.

7. A wind turbine comprising:
a rotor; and
an electric drive device;
wherein the electric drive device comprises the electronic drive device of claim 1.

8. The wind turbine of claim 7 further comprising a generator configured to be driven by the rotor;
wherein the pyrotechnic fuse is provided between the generator and the power electronics module of the drive device.

9. The wind turbine of claim 7 further comprising a generator configured to be driven by the rotor.

10. A machine comprising:
an electric drive device;
wherein the electric drive device comprises the electronic drive device of claim 1; and
wherein the machine is selected from the group consisting of a material transfer machine, a construction machine, a surface miner, an excavator, a crane, and a crawler type vehicle.

11. A machine comprising:
an electric drive device;
wherein the electric drive device comprises the electronic drive device of claim 1; and
wherein the machine is selected from the group consisting of an oil drilling platform, a ship, and a container crane.

12. An electric drive device comprising:
a power electronics module comprising:
a voltage circuit comprising a power electronic component;
an intermediate capacitor circuit comprising an intermediate circuit capacitor;
a rectifier and an inverter connected to one another via the intermediate capacitor circuit;
a first pyrotechnic fuse with a propellant charge for irreversible interruption of the voltage circuit in an event that necessitates the irreversible interruption of the voltage circuit; and
a second pyrotechnic fuse with the propellant charge for irreversible interruption of the voltage circuit in an event that necessitates the irreversible interruption of the voltage circuit;
wherein the first pyrotechnic fuse is arranged between the intermediate capacitor circuit and the power electronic component;
wherein each of the first pyrotechnic fuse and the second pyrotechnic fuse is adapted to:
receive a disconnection signal that indicates a defect at the power electronics module and that accompanies one or both of an excessive voltage and current change at the power electronics module;
trigger in dependence on the received disconnection signal; and
interrupt the voltage circuit; and
wherein the propellant charge is adapted to be ignited by one or both of:
one or both current and voltage from a coil that is provided as an isolator layer in the intermediate circuit capacitor; and
one or both a voltage and current measurement signal that indicates one or both voltage and current at the intermediate circuit capacitor.

13. The electric drive device of claim 12, wherein the second pyrotechnic fuse is arranged between the intermediate capacitor circuit and a DC bus system.

14. The electric drive device of claim 12, wherein the second pyrotechnic fuse is arranged between the intermediate capacitor circuit and an IGBT module.

15. The electric drive device of claim 12, wherein the second pyrotechnic fuse is provided between a generator and a converter.

16. The electric drive device of claim 12, wherein the second pyrotechnic fuse is provided between a converter of the power electronics module and its power connector for connection to a power grid.

* * * * *